United States Patent
Kato et al.

(10) Patent No.: US 11,251,677 B2
(45) Date of Patent: Feb. 15, 2022

(54) MOTOR AND COMPRESSOR THAT USES SAME

(71) Applicant: Hitachi Industrial Equipment Systems Co., Ltd., Tokyo (JP)

(72) Inventors: Fuminori Kato, Tokyo (JP); Yoshiyuki Kanemoto, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 194 days.

(21) Appl. No.: 16/476,892

(22) PCT Filed: Jan. 25, 2017

(86) PCT No.: PCT/JP2017/002485
§ 371 (c)(1),
(2) Date: Jul. 10, 2019

(87) PCT Pub. No.: WO2018/138795
PCT Pub. Date: Aug. 2, 2018

(65) Prior Publication Data
US 2019/0334408 A1    Oct. 31, 2019

(51) Int. Cl.
*H02K 5/18* (2006.01)
*H02K 9/06* (2006.01)
*F25B 31/02* (2006.01)

(52) U.S. Cl.
CPC ............. *H02K 5/18* (2013.01); *F25B 31/026* (2013.01); *H02K 9/06* (2013.01)

(58) Field of Classification Search
CPC .. H02K 5/18; H02K 9/06; H02K 1/02; H02K 3/345; H02K 16/02; H02K 1/2793; H02K 7/14; F25B 31/026
See application file for complete search history.

(56) References Cited

U.S. PATENT DOCUMENTS

| 4,867,657 A | 9/1989 | Kotlarek et al. |
| 5,334,897 A | 8/1994 | Ineson et al. |
| 5,520,526 A | 5/1996 | Fujio |

(Continued)

FOREIGN PATENT DOCUMENTS

| JP | 50-32402 A | 3/1975 |
| JP | 55-43386 U | 3/1980 |

(Continued)

OTHER PUBLICATIONS

Hindi-language Office Action issued in Indian Application No. 201917027279 dated Jun. 22, 2020 with English translation (five (5) pages).

(Continued)

*Primary Examiner* — Thomas Truong
(74) *Attorney, Agent, or Firm* — Crowell & Moring LLP

(57) ABSTRACT

Provided are: a motor for which high strength can be obtained in a motor casing; and a compressor that uses the motor. This motor 10 has: a rotating shaft 12 provided in a rotatable manner; a rotor 32 that rotates integrally with the rotating shaft 12; a stator 31 that rotationally drives the rotor 32; and a motor casing 14 that is a cylindrical body for accommodating the rotor 32 and the stator 31, and has, on the outer circumferential surface thereof, ribs 22 extending in a circumferential direction.

12 Claims, 6 Drawing Sheets

(56) References Cited

U.S. PATENT DOCUMENTS

| | | | |
|---|---|---|---|
| 2007/0278879 A1* | 12/2007 | Kaminski | H02K 5/18 310/86 |
| 2011/0300012 A1* | 12/2011 | Fujioka | F01C 1/0215 418/55.1 |
| 2012/0301334 A1 | 11/2012 | Huang et al. | |
| 2015/0093269 A1 | 4/2015 | Iwano et al. | |
| 2015/0093276 A1 | 4/2015 | Kanemoto et al. | |
| 2015/0108859 A1 | 4/2015 | Nakazumi et al. | |
| 2017/0126108 A1 | 5/2017 | Tokoi et al. | |
| 2018/0183301 A1* | 6/2018 | Lange | H02K 9/04 |
| 2019/0081519 A1* | 3/2019 | Baba | H02K 15/02 |

FOREIGN PATENT DOCUMENTS

| | | | |
|---|---|---|---|
| JP | 247895 A | 2/1990 | |
| JP | 6-351186 A | 12/1994 | |
| JP | 7-184351 A | 7/1995 | |
| JP | 10-285874 A | 10/1998 | |
| JP | 2003-13870 A | 1/2003 | |
| JP | 2003-21065 A | 1/2003 | |
| JP | 2007-60834 A | 3/2007 | |
| JP | 2007-189812 A | 7/2007 | |
| JP | 2007-259609 A | 10/2007 | |
| JP | 2013-126275 A | 6/2013 | |
| JP | 2013-240215 A | 11/2013 | |
| JP | 2015-6083 A | 1/2015 | |
| JP | 2016-50798 A | 3/2015 | |
| JP | 2015-68248 A | 4/2015 | |
| JP | 2017-17892 A | 1/2017 | |
| WO | WO 2015/162819 A1 | 10/2015 | |

OTHER PUBLICATIONS

Japanese-language Office Action issued in Japanese Application No. 2018-563984 dated Jul. 7, 2020 with English translation (nine (9) pages).

International Search Report (PCT/ISA/210) issued in PCT Application No. PCT/JP2017/002485 dated Apr. 18, 2017 with English translation (five pages).

Japanese-language Written Opinion (PCT/ISA/237) issued in PCT Application No. PCT/JP2017/002485 dated Apr. 18, 2017 (five pages).

Extended European Search Report issued in European Application No. 17894314.8 dated Jul. 21, 2020 (11 pages).

Japanese-language Office Action issued in Japanese Application No. 2018-563984 dated Mar. 2, 2021 with English translation (eight (8) pages).

Japanese-language Office Action issued in Japanese Application No. 2018-563984 dated Oct. 26, 2021 with English translation (seven (7) pages).

* cited by examiner

MOTOR AND COMPRESSOR THAT USES SAME

TECHNICAL FIELD

The present invention relates to a motor and a compressor that uses the motor.

BACKGROUND ART

A motor that drives a compressor has a configuration in which a rotor and a stator that drives the rotor are integrally accommodated in a motor casing. For example, Patent Document 1 discloses a compressor in which a rotor and a stator are accommodated in a motor casing and which includes a drive shaft that penetrates the rotor so as to drive a turning scroll.

CITATION LIST

Patent Document

Patent Document 1: JP 2015-68248 A

SUMMARY OF THE INVENTION

Problems to be Solved by the Invention

In the above-described motor, a high temperature or high pressure may be applied to the motor casing during an operation or manufacture. For example, when the stator is installed to be molded with a resin press-fitted in the motor casing, a high temperature or high pressure may be applied to the motor casing at the time of a resin press-fitting, and thus the motor casing may be distorted. In this manner, there may be a demand for a motor casing having higher strength depending on specifications of a motor or a condition during an operation.

Hence, an object of the invention is to provide a motor for which high strength can be obtained in a motor casing and a compressor that uses the motor.

Solutions to Problems

A preferred embodiment of a motor according to the invention includes: a rotating shaft provided in a rotatable manner; a rotor that rotates integrally with the rotating shaft; a stator that rotationally drives the rotor; and a motor casing that is a cylindrical body for accommodating the rotor and the stator, and has, on an outer circumferential surface of the motor casing, ribs extending in a circumferential direction.

In addition, the invention is configured also as a compressor that uses the above-described motor.

Effects of the Invention

According to the invention, it is possible to realize a motor for which high strength can be obtained in a motor casing and a compressor that uses the motor.

MODE FOR CARRYING OUT THE INVENTION

Example 1

Figure 1A:
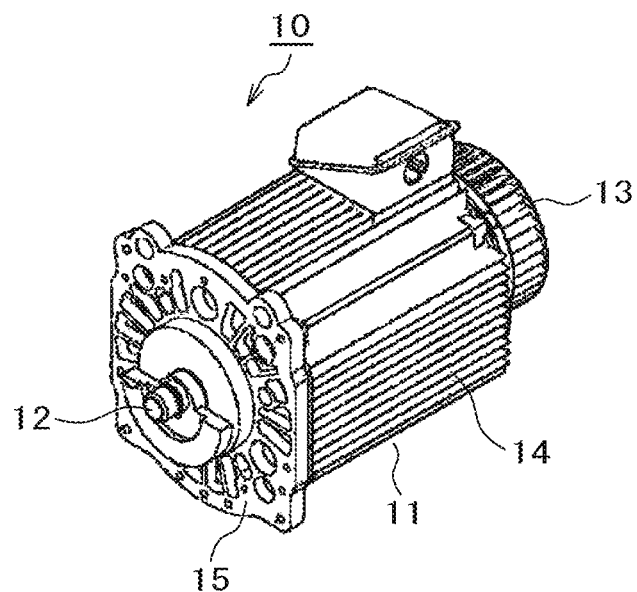
FIG. 1A is an external perspective view of a motor according to Example 1.
Figure 1B:
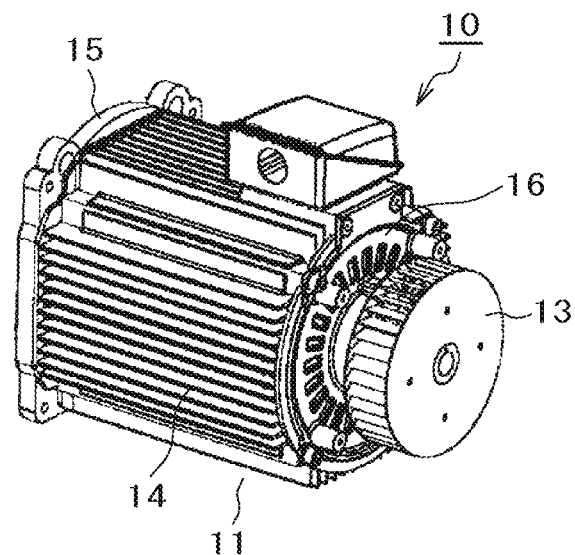
FIG. 1B is an external perspective view of the motor according to Example 1.
Figure 2:
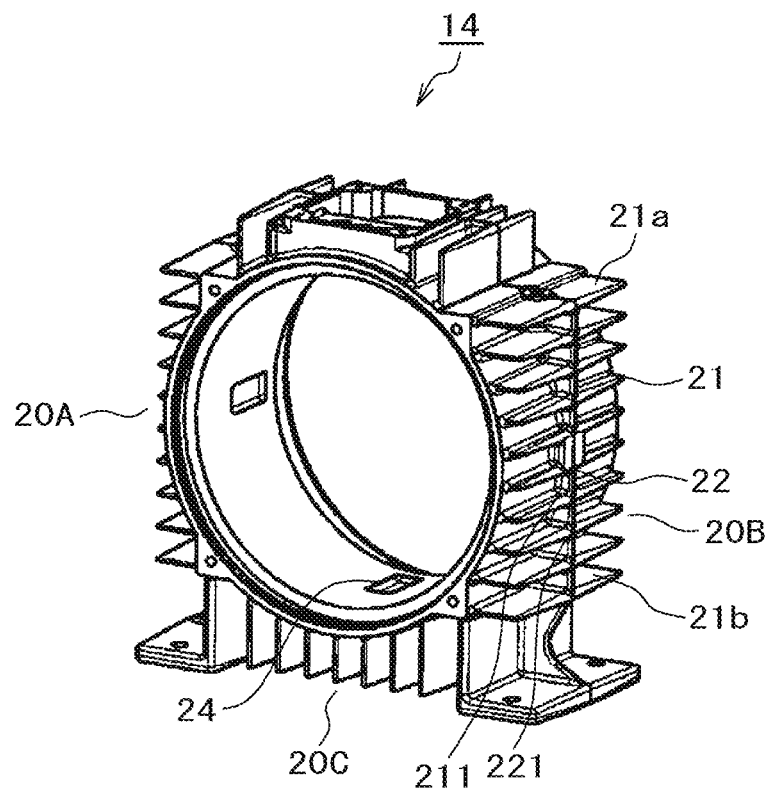
FIG. 2 is a perspective view illustrating a configuration of a motor casing 14 detached from a motor cover 11.

With reference to FIGS. 1A, 1B, and 2, a configuration of a motor 10 according to Example 1 is described. FIGS. 1A and 1B illustrate external perspective views of a motor according to Example 1. In FIGS. 1A and 1B, 11 represents a motor cover, represents a rotating shaft, and 13 represents a cooling fan. The motor cover 11 has a motor casing 14 that houses a stator and a rotor. The motor cover 11 has a configuration in which the motor casing 14 has a cylindrical shape with opening portions formed on both sides, a flange 15 is provided at one opening portion, and an end bracket 16 is provided at another opening portion. The cooling fan 13 suctions external air from a suction hole provided at a side of an opposite surface of the end bracket 16 and generates cooling air through rotation of a rotary vane.

The motor 10 may be an axial gap type in which the rotor and the stator are disposed to be opposite to each other in a direction parallel to the rotating shaft 12, or may be a radial gap type in which the stator is disposed at an outer diameter side of the rotor. An internal configuration of the motor casing 14 will be described below in detail.

FIG. 2 is a perspective view illustrating a configuration of the motor casing 14 detached from the motor cover 11. As illustrated in FIG. 2, a plurality of cooling fins 21 that dissipate heat in the motor casing 14 are provided to project from outer circumferential surfaces of sides 20A and 20B and an underside 20C of the motor casing 14. The plurality of cooling fins 21 are each arrayed to extend side by side from one opening side to the other opening side of the motor casing 14. That is, the cooling fins 21 are provided to be aligned along the outer circumferential surfaces of the motor casing 14 in a state in which the fins are parallel to each other. Incidentally, an inner circumferential surface of the motor casing 14 has a fixing portion 24 formed for fixing the stator.

Ribs 22 that extend in a circumferential direction of the motor casing 14 are provided to project from outer circumferential surfaces of the motor casing 14 at both sides 20A and 20B and the underside 20C of the motor casing 14. The ribs 22 intersect the cooling fins 21 so as to be formed integrally with the cooling fins at a substantially central position of the cooling fins 14 in a width direction.

In an example illustrated in FIG. 2, one line rib 22 is provided to intersect the cooling fins from the uppermost cooling fin 21a to the lowermost cooling fin 21b at each of the both sides 20A and 20B of the motor casing 14. In addition, although not illustrated in the drawings, similarly, at the underside 20C of the motor casing 14, the rib 22 is provided to intersect the cooling fins 21 from a left end side to a right end side in FIG. 2 at the substantially central position of the cooling fins 21 in the width direction.

In an example illustrated in FIG. 2, top portions 221 of the ribs 22 are all formed to be flush with top portions 211 of the cooling fins 21.

As described above, the ribs 22 are provided on the outer circumferential surfaces of the motor casing 14, and thereby strength of the motor casing 14 increases in the circumferential direction thereof.

Incidentally, FIG. 2 illustrates a configuration in which the rib 22 is provided to intersect the cooling fins from the uppermost cooling fin 21a to the lowermost cooling fin 21b at each of the both sides 20A and 20B of the motor casing 14. The motor 10 according to Example 1 is not limited thereto. The rib 22 may be provided from a position lower than the uppermost cooling fin 21a or may be provided from a position higher than the lowermost cooling fin 21b.

In addition, in the example illustrated in FIG. 2, one line rib 22 is provided at each center of the both sides 20A and 20B and the underside 20C of the motor casing 14. However, the configuration is not limited thereto, and multiple line of ribs may be provided at each of the both sides 20A and 20B and the underside 20C of the motor casing 14. Consequently, the strength of the motor casing 14 further increases.

In addition, in the example illustrated in FIG. 2, a configuration in which the ribs 22 are provided at the both sides 20A and 20B and the underside 20C of the motor casing 14 is illustrated. The motor 10 according to Example 1 is not limited thereto. The motor may have a configuration in which the rib 22 is provided at only one of the sides 20A and 20B of the motor casing 14 or a configuration in which the rib 22 is not provided at the underside 20C.

In addition, in the configuration illustrated in FIG. 1, the rib 22 is configured to be provided at the substantially central position of the cooling fins 21 in the width direction. However, the configuration is not limited thereto, and the rib 22 may be provided at a position close to the one opening side of the motor casing 14.

Example 2

Figure 3:
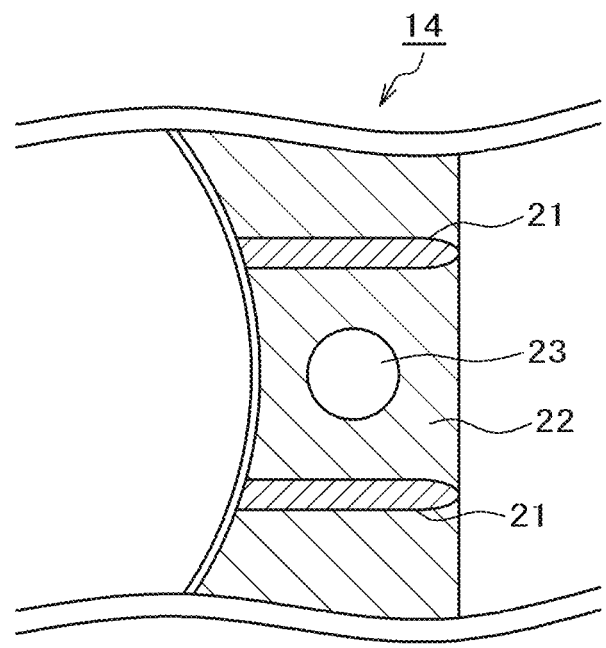
FIG. 3 is an enlarged view illustrating a part of an outer circumferential surface of a motor casing 14 of a motor according to Example 2.
Figure 4:
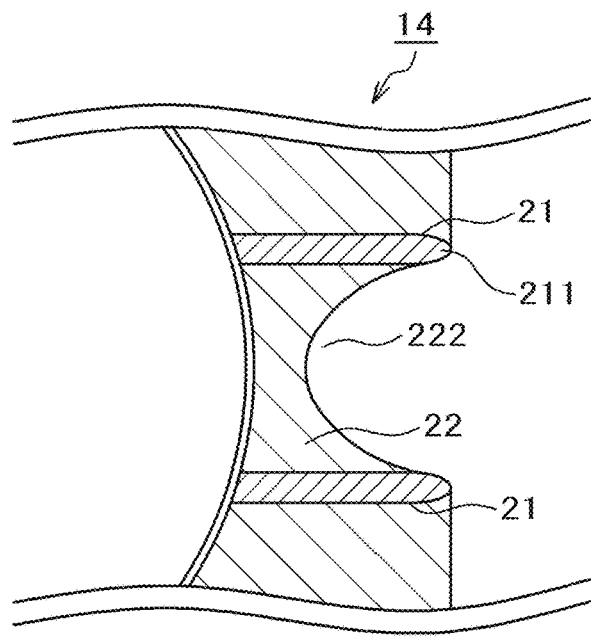
FIG. 4 is an enlarged view illustrating a part of an outer circumferential surface of a motor casing 14 of a motor according to Example 3.

Next, a motor according to Example 2 will be described with reference to FIGS. 3 and 4. FIGS. 3 and 4 are enlarged views illustrating a part of the outer circumferential surface of the motor casing 14 of the motor according to Example 2. In an example illustrated in FIG. 3, a vent hole 23 is provided at a part of the rib 22. In addition, in an example illustrated in FIG. 4, a part of the rib 22 forms a recessed portion 222. That is, the recessed portion 222 at a part of the rib 22 is provided at a position lower than the top portion 211 of the cooling fin 21.

According to configurations illustrated in FIGS. 3 and 4, external air around the motor casing 14 can pass through the hole 23 or the recessed portion 222 of the rib 22, and thus a suction efficiency of the external air from the suction hole of the cooling fan 13 improves. Hence, a cooling efficiency by the cooling fan 13 can be improved. Incidentally, the motor according to Example 2 has the same configuration as that of the motor 10 of Example 1 except for the description provided above, and thus the description thereof is omitted.

Example 3

In Example 3, a manufacturing method suitable for preparing the motor casing 14 (refer to FIG. 2) of the motor 10 according to Example 1 is described.

(Process 1) First, a sand mold is prepared. Preparation of the sand mold is as follows. Dies are prepared to produce shapes of outer circumferential surfaces corresponding to regions halved at the position of the rib 22 of the motor casing 14 illustrated in FIG. 2, and the dies are each pressed against sand such that a left sand mold and a right sand mold as main molds are prepared. Further, a core for preparing a shape of the inner circumferential surface of the motor casing 14 is prepared by using the same sand as that used to prepare the main molds.

(Process 2) Next, the left sand mold and the right sand mold are connected to surround the core prepared in (Process 1) such that division surfaces thereof are joined together.

(Process 3) Next, molten metal is poured in the sand molds connected in (Process 2), remains as is for a predetermined time, and is cooled. For example, molten Al can be used as the molten metal.

(Process 4) After the molten metal in the sand molds is cooled and solidified, the sand molds are removed such that a metal-molded body is taken out. It is possible to break down to remove the sand molds while pulling out both the left sand mold and the right sand mold in a vertical direction with respect to an opening plane of the motor casing 14.

(Process 5) Subsequently, a burr of the metal-molded body is polished and removed. Incidentally, the burr is generated when a part of the molten metal injected into the sand mold is solidified in a state of flowing out from a connection surface or the like of the sand mold.

In the metal-molded body prepared as described above, the position of the rib 22 is the connection surface between the left sand mold and the right sand mold, and thus the burr is mainly formed at the position of the rib 22. Hence, a front surface of the rib 22 or top portions of the cooling fins 21 around the rib is mainly polished by a grinder or the like, and thereby it is possible to remove most of the burr. Hence, it is possible to significantly reduce time and effort for polishing a back surface of the cooling fin 21. The front surface of the rib 22 and a front surface of the cooling fin 21 are polished by a grinder or the like, and thereby the top portion 221 of the rib 22 is formed to be flush with the top portions 211 of the cooling fins 21.

Example 4

Figure 5A:
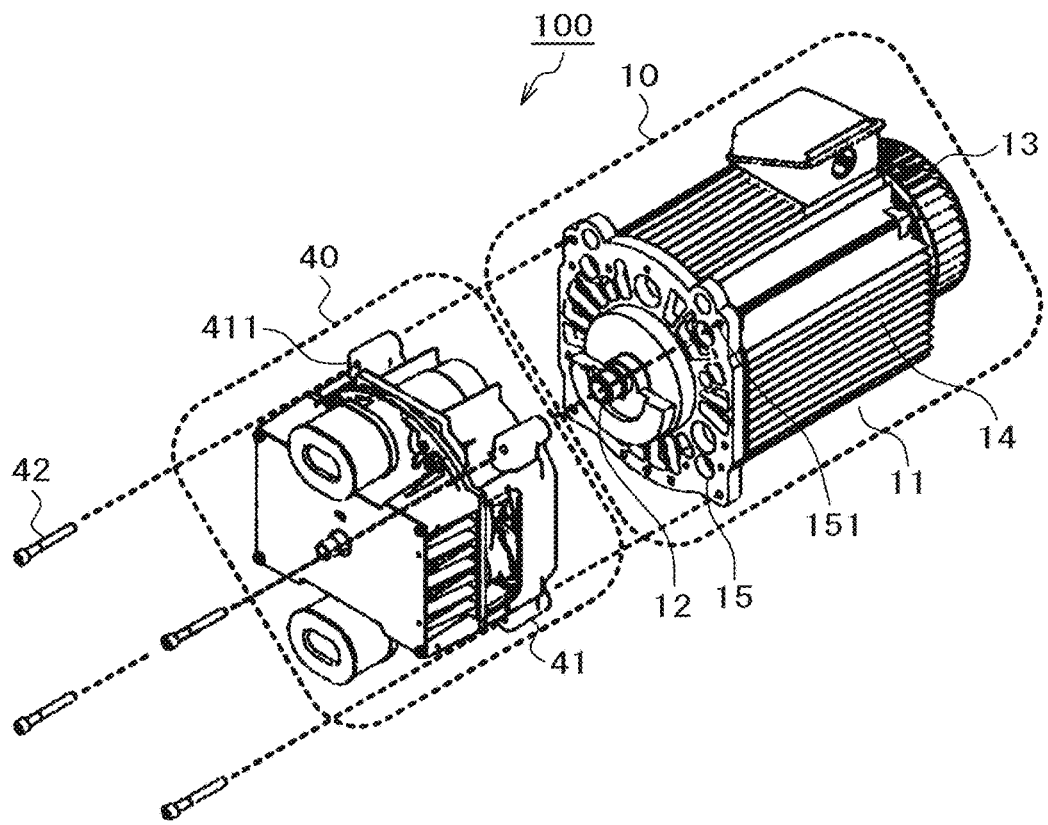
FIG. 5A is a perspective view illustrating a state in which a compression unit 40 and a motor 10 of a compressor 100 according to Example 5 are separated from each other.
Figure 5B:
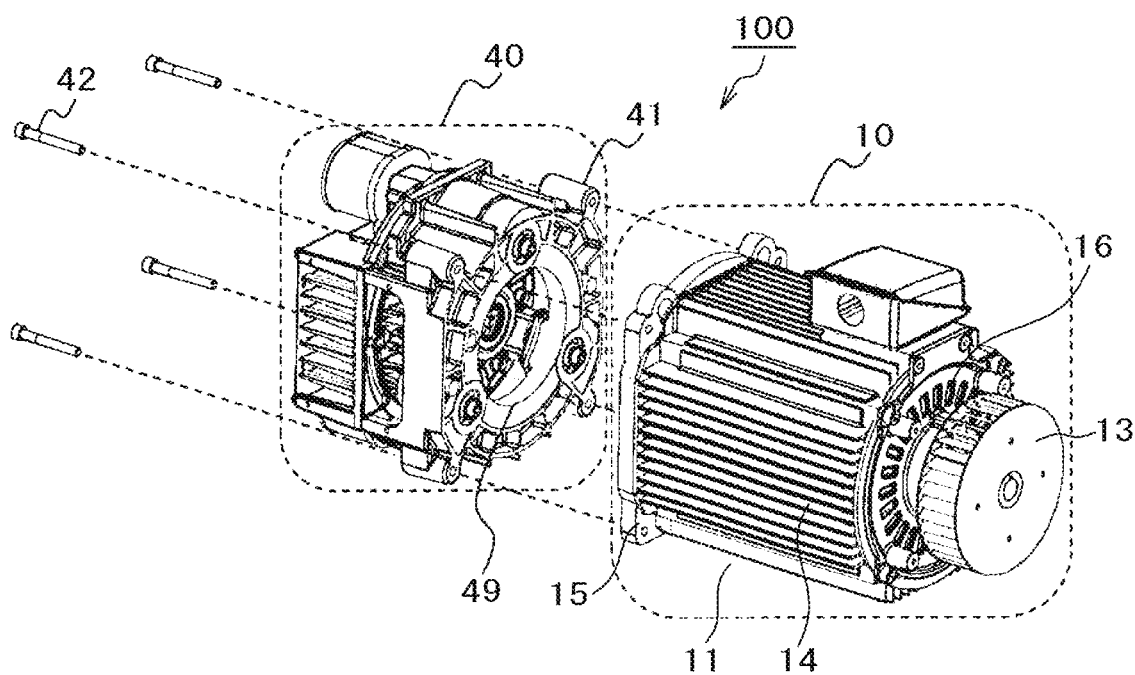
FIG. 5B is a perspective view illustrating a state in which the compression unit 40 and the motor 10 of the compressor 100 according to Example 5 are separated from each other.

Next, a configuration of a compressor according to Example 4 will be described with reference to FIGS. 5A, 5B, 6, and 7. FIGS. 5A and 5B are perspective views of a state in which a compression unit 40 and the motor 10 of a compressor 100 according to Example 4 are separated from each other. As illustrated in FIGS. 5A and 5B, the compressor 100 includes the compression unit 40 that compresses a fluid and the motor 10 that drives the compression unit 40. As the motor 10, the motor 10 (refer to FIGS. 1A, 1B, and 2) described in Example 1 is used. In the following description, as the motor 10, a configuration, in which an axial gap type motor is employed, will be described as an example.

As illustrated in FIGS. 5A and 5B, the flange 15 of the motor cover 11 is fastened with a main-body casing 41 of the compression unit 40, and thereby the motor 10 can be provided integrally with the compression unit 40. Specifically, the rotating shaft 12 is inserted at a predetermined position of the compression unit 40, and a fastening bolt 42 is inserted into a bolt inserting hole 151 provided in the flange 15 of the motor cover 11 and a bolt inserting hole 411 provided in the main-body casing 41, and thereby the flange 15 of the motor 10 and the main-body casing 41 can be fastened with each other. An insertion position of the rotating shaft 12 in the compression unit 40 will be described below.

Figure 6:
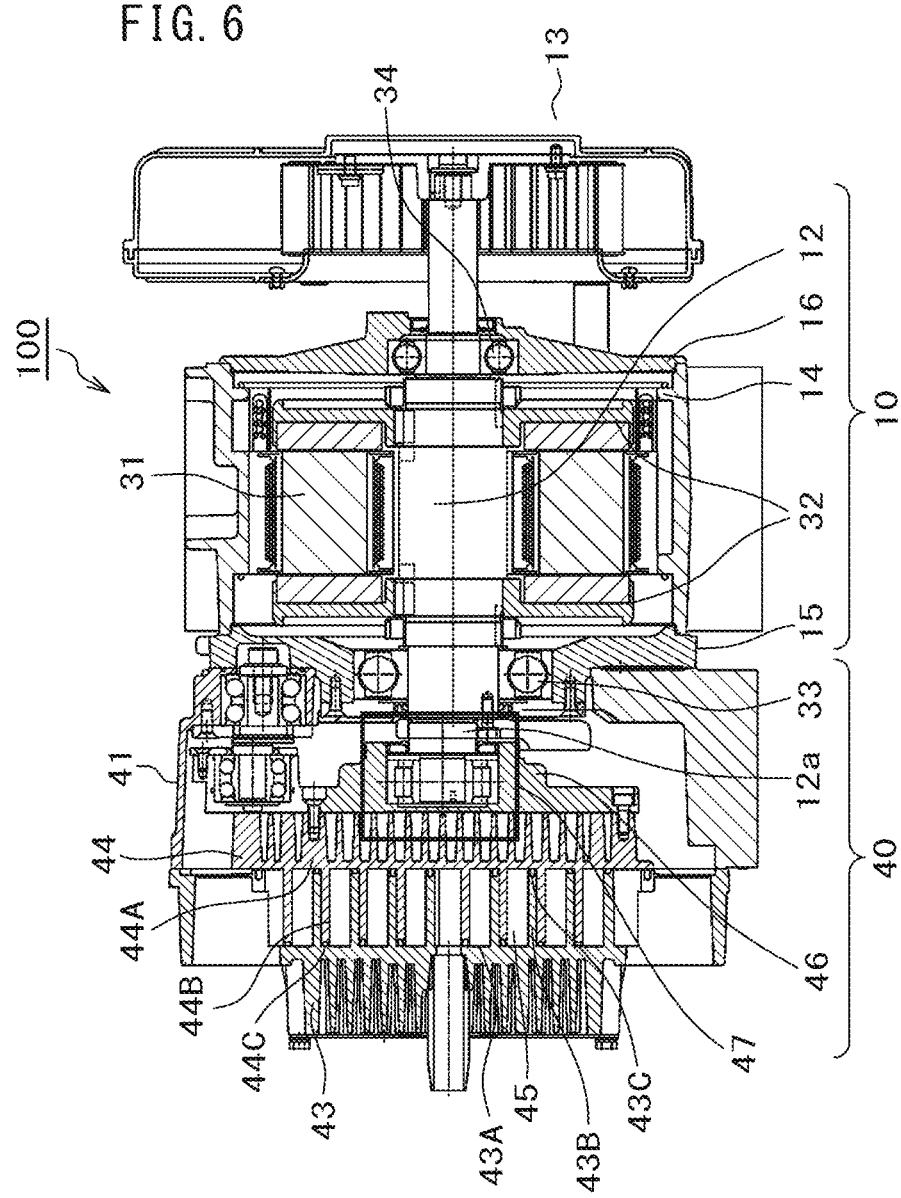
FIG. 6 illustrates a cross-sectional view of the compressor 100 having a configuration in which the motor 10 and the compression unit 40 illustrated in FIGS. 5A and 5B are integrated with each other, when viewed from a side.

FIG. 6 illustrates a cross-sectional view of the compressor 100 having a configuration in which the motor 10 and the compression unit 40 illustrated in FIGS. 5A and 5B are integrated with each other, when viewed from a side. In the motor casing 14, a disk-shaped stator 31 is disposed between a pair of disk-shaped rotors 32. The rotating shaft 12 is provided to penetrate a central portion of the stator 31 and the rotors 32 and is rotatably supported by a main bearing 33 provided on a side of the compression unit 40 and an anti-load bearing 34 provided on an opposite side of the main bearing 33 with the stator 31 interposed between the main bearing and the anti-load bearing. The main bearing 33 and the anti-load bearing 34 are disposed to be concentric with each other. The rotating shaft 12 has an eccentric portion 12a at an end portion on a side of the main bearing 33.

A gap is formed between the stator 31 and the rotor 32. Consequently, the stator 31 and the rotor 32 are housed in the motor casing 14 in a state of being disposed to be opposite to each other with the gap interposed therebetween in the direction parallel to the rotating shaft 12.

Figure 7:
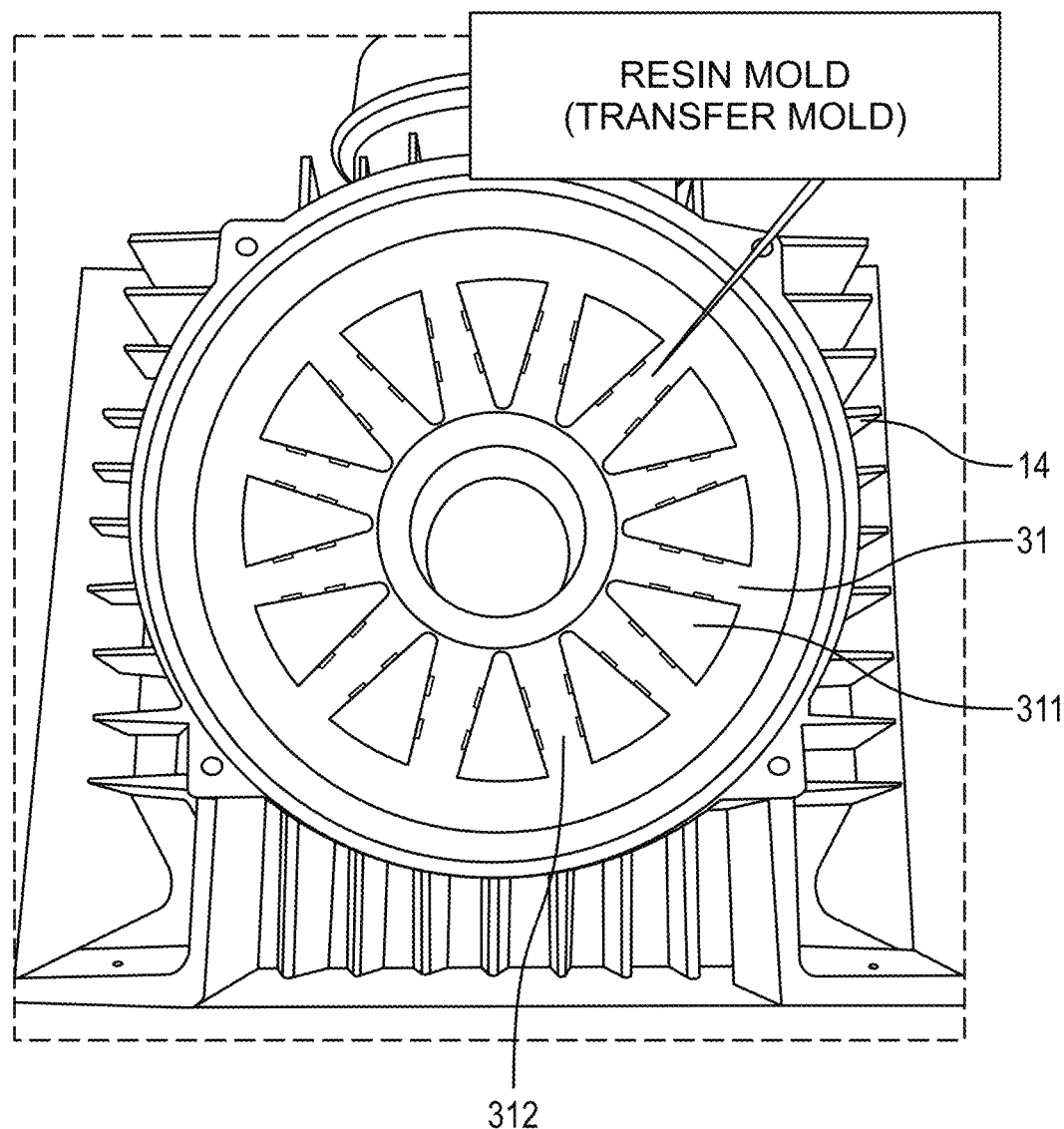
FIG. 7 is a picture showing an inside of the motor casing 14 before a rotor 32 is installed, when viewed from an opening side of the motor casing 14.

FIG. 7 is a picture showing an inside of the motor casing 14 before a rotor 32 is installed, when viewed from an opening side of the motor casing 14. In FIG. 7, a surface of the stator 31 is illustrated in an exposed state, the surface being opposite to the rotor 32.

The stator 31 has a configuration in which a plurality of iron core pieces 311 are disposed at equal intervals in the circumferential direction. A coil is wound around the iron core piece 311 via a nonmagnetic body. The iron core pieces 311 disposed in the circumferential direction are molded integrally with each other by being resin-molded with a resin material 312 so as to be fixed to the motor casing 14. For example, the iron core piece 311 can be configured of an electromagnetic steel sheet or an amorphous metal.

When current flows in the coil wound around the iron core piece 311 of the stator 31, a rotating force is applied to the rotor 32 due to a magnetic field generated by the stator 31 and the rotor 32. The rotating shaft 12 rotates as the rotor 32 rotates.

When the iron core piece 311 is formed by the amorphous metal, a loss is significantly lower compared to another magnetic material, and magnetic permeability is high. Hence, high motor efficiency is obtained. On the other hand, the amorphous metal has high hardness, is brittle, and is used in a state of having a relatively thin sheet thickness, and thus the amorphous metal is unsuitable for a process such as punching.

In the axial gap type motor, the stator 31 can be configured to have the iron core piece 311 obtained by stacking fan-shaped (refer to FIG. 7) foil strips that can be relatively easily produced. Hence, the axial gap type motor is suitable for using the amorphous metal since it is possible to produce the stator 31 without performing a punching process of a complex shape.

When the axial gap type motor is manufactured, as described above, after the iron core pieces 311 are disposed in the circumferential direction in the motor casing 14, a method of forming the stator 31 by resin molding with the resin material 312 is often employed. In this case, during the resin molding, the resin material is injected into the motor casing 14 at a high temperature and high pressure of about 4 MPa (transfer mold). Hence, high pressure is loaded to the motor casing 14 from an inner circumferential side.

The motor 10 described in Example 1 is used in the compressor 100 according to Example 4, and thus strength in the circumferential direction increases in the motor casing 14. Hence, an occurrence of deformation or a crack in the motor casing 14 due to the pressure applied during the resin molding can be inhibited, and it is possible to obtain an external appearance suitable as the motor 10.

As illustrated in FIG. 6, the compression unit 40 includes a fixed scroll 43 and a turning scroll 44 disposed to be opposite to the fixed scroll 43. The fixed scroll 43 and the turning scroll 44 are accommodated in the main-body casing 41.

The main-body casing 41 is a cylindrical body having opening portions at both ends of the main-body casing, the fixed scroll 43 is attached to one opening portion, and the motor 10 is attached to another opening portion 49 (refer to FIG. 5B).

The fixed scroll 43 and the turning scroll 44 have spiral lap portions 43B and 44B formed on front surfaces of mirror plates 43A and 44A, respectively. The lap portion 43B of the fixed scroll 43 and the lap portion 44B of the turning scroll intermesh with each other, and thereby a compression chamber 45 is formed. The lap portion 43B of the fixed scroll 43 and the lap portion 44B of the turning scroll 44 have tip seals 43C and 44C, respectively, at front ends of the lap portions.

A back surface of the turning scroll 44 has a turning bearing 47 provided in a boss portion 46. The eccentric portion 12a of the rotating shaft 12 is inserted into the turning bearing 47, and thereby the eccentric portion 12a of the rotating shaft 12 is supported by the turning scroll 44.

The eccentric portion 12a of the rotating shaft 12 performs an eccentric motion as the rotating shaft 12 performs a rotary motion. Hence, when the rotating shaft 12 is rotatably driven by the motor 10, the turning scroll 44 connected to the eccentric portion 12a performs a turning motion. When the turning scroll 44 performs the turning motion, the compression chamber 45 demarcated between the lap portion 43B of the fixed scroll 43 and the lap portion 44B of the turning scroll 44 is continuously reduced. Consequently, a fluid introduced into the compression chamber 45 is compressed, and compressed air is discharged to the outside of the compression unit 40. Incidentally, although omitted in the drawings, one of a plurality of compression chambers 45 becomes an intake port of the fluid, and one of the plurality of compression chambers 45 becomes a discharge port of a compressed fluid.

In the compressor 100 described above, the eccentric portion 12a at an end portion of the rotating shaft 12 is directly connected to a back surface portion of the turning scroll 44, and a drive force of the rotating shaft 12 is directly transmitted to the turning scroll 44. In this manner, the turning scroll 44 performs the turning motion. Therefore, in order to realize a smooth turning motion of the turning scroll 44, the eccentric portion 12a of the rotating shaft 12 needs to be supported by the back surface of the turning scroll 44 in an appropriate state. Therefore, installation positions of respective members such as the main bearing 33, the anti-load bearing 34, and the turning bearing 47 are adjusted with high accuracy in a design stage. In this case, when the motor casing 14 is distorted during manufacturing of the motor 10, the installation positions are shifted, and the rotating shaft 12 is not supported by the compression unit 40 in the appropriate state. In this case, the turning motion of the turning scroll 44 is hindered in some cases.

In the compressor 100 according to Example 4, the motor in which the ribs 22 are provided on the outer circumferential surfaces of the motor casing 14 is used as the motor 10. Therefore, the strength of the motor casing 14 in the circumferential direction increases, and thus the occurrence of deformation, a crack, or the like is inhibited. Hence, such a negative effect described above is unlikely to occur, and thus it is possible to realize a smooth compression operation in a so-called single shaft type of scroll compressor 100.

In Example 4 described above, as the motor 10, a configuration, in which the motor 10 according to Example 1 is used, is described as an example. The compressor 100 according to Example 4 is not limited thereto, and the compressor can be configured to use the motor described in Example 2.

In addition, in Example 4, the configuration of the compressor 100 including the scroll type compression unit 40 is described as an example, the invention is not limited thereto. For example, it is possible to employ a configuration obtained by combining a reciprocal compression unit with the motor 10 according to Example 1.

REFERENCE SIGNS LIST

10 Motor
100 Compressor
11 Motor cover
12 Rotating shaft
12*a* Eccentric portion
13 Cooling fan
14 Motor casing
14 Flange
151, 411 Bolt inserting hole
16 End bracket
20A, 20B Side
20C Underside
21 Cooling fin
21*a* Uppermost cooling fin
21*b* Lowermost cooling fin
211 Top portion
22 Rib
221 Top portion
23 Hole
31 Stator
311 Iron core piece
312 Resin material
32 Rotor
33 Main bearing
34 Anti-load bearing
40 Compression unit
41 Main-body casing
42 Fastening bolt
43 Fixed scroll
44 Turning scroll
43A, 44A Mirror plate
43B, 44B Spiral lap portion
43C, 44C Tip seal
45 Compression chamber
46 Boss portion
47 Turning bearing

The invention claimed is:

1. A motor comprising:
a rotating shaft provided in a rotatable manner;
a rotor that rotates integrally with the rotating shaft;
a stator that rotationally drives the rotor; and
a motor casing that is a cylindrical body for accommodating the rotor and the stator, in which the stator is resin-molded on an inner circumferential side of the motor casing, and has, on an outer circumferential surface of the motor casing, ribs extending in a circumferential direction;
wherein the motor casing has opening portions on both sides of the motor casing and a plurality of cooling fins that are arrayed on the outer circumferential surface of the motor casing, the cooling fins extending side by side from one opening side to the other opening side of the motor casing.

2. The motor according to claim 1,
wherein top portions of the ribs are provided to be flush with top portions of the cooling fins.

3. The motor according to claim 1,
wherein the ribs have a hole.

4. The motor according to claim 1,
wherein the ribs have a recessed shape.

5. The motor according to claim 1,
wherein the ribs are provided at a side of the motor casing.

6. The motor according to claim 5,
wherein the ribs are provided on an underside of the motor casing.

7. The motor according to claim 1,
wherein the stator has a configuration in which a plurality of iron core pieces around which respective coils are wound are disposed in a circumferential direction and the iron core pieces are resin-molded, and
wherein the stator and the rotor are disposed to be opposite to each other with a gap interposed between the stator and the rotor in a direction parallel to the rotating shaft.

8. The motor according to claim 7,
wherein the iron core pieces are formed of an amorphous metal.

9. A compressor comprising:
a compression unit that compresses a fluid; and
a motor that drives the compression unit,
wherein the motor includes
a rotating shaft provided in a rotatable manner,
a rotor that rotates integrally with the rotating shaft,
a stator that rotationally drives the rotor, and
a motor casing that is a cylindrical body for accommodating the rotor and the stator, in which the stator is resin-molded on an inner circumferential side of the motor casing, and has, on an outer circumferential surface of the motor casing, ribs extending in a circumferential direction;
wherein the motor casing has opening portions on both sides of the motor casing and a plurality of cooling fins that are arrayed on the outer circumferential surface of the motor casing, the cooling fins extending side by side from one opening side to the other opening side of the motor casing.

10. The compressor according to claim 9,
wherein the compression unit has a turning scroll, which supports an end portion of the rotating shaft and performs a turning motion due to rotation of the rotating shaft, and a fixed scroll disposed to be opposite to the turning scroll, wherein the turning scroll and the fixed scroll have respective mirror plates and spiral lap portions provided to be upright on the mirror plates, and the lap portions are provided to intermesh with each other.

11. The compressor according to claim 9, wherein the stator has a configuration in which a plurality of iron core pieces around which respective coils are wound are disposed in a circumferential direction and the iron core pieces are resin-molded, and wherein the stator and the rotor are disposed to be opposite to each other with a gap interposed between the stator and the rotor in a direction parallel to the rotating shaft.

12. The compressor according to claim 11, wherein the iron core pieces are formed of an amorphous metal.

* * * * *